United States Patent
De Filippo

[11] Patent Number: 5,342,115
[45] Date of Patent: Aug. 30, 1994

[54] ARM REST FOR MOTOR VEHICLE SEATS

[75] Inventor: Emilio De Filippo, Bruzolo, Italy

[73] Assignee: Gestind-M.B. "Manifattura Di Bruzolo" S.p.A., Bruzolo, Italy

[21] Appl. No.: 28,118

[22] Filed: Mar. 9, 1993

[30] Foreign Application Priority Data

May 21, 1992 [IT] Italy ............... 000436 A/92
May 25, 1992 [IT] Italy ............... 000441 A/92
Jun. 16, 1992 [IT] Italy ............... 000514 A/92

[51] Int. Cl.$^5$ .............................................. A47C 7/54
[52] U.S. Cl. ........................... 297/411.32; 297/113; 403/104
[58] Field of Search ............... 297/113–115, 297/411.29, 411.32; 403/93, 104, 106

[56] References Cited

U.S. PATENT DOCUMENTS

| 2,661,227 | 12/1953 | Murphy | 297/411.29 X |
| 3,612,606 | 10/1971 | Swenson | 297/411.32 X |
| 3,807,799 | 4/1974 | Freedman | |
| 4,040,665 | 8/1977 | Wallace et al. | |
| 4,067,613 | 1/1978 | Pesiri | |
| 4,118,069 | 10/1978 | Hunter | 297/411.32 X |
| 4,205,879 | 6/1980 | Heling | 297/411.29 X |
| 4,785,190 | 11/1988 | Frankena | 403/93 X |
| 4,848,840 | 7/1989 | Toya | |
| 4,902,072 | 2/1990 | Chancellor | 297/411.32 |

FOREIGN PATENT DOCUMENTS

1505725 3/1970 Fed. Rep. of Germany .
0348276 12/1989 France .
2170099 7/1986 United Kingdom .

Primary Examiner—Peter R. Brown
Attorney, Agent, or Firm—Sughrue, Mion, Zinn, Macpeak & Seas

[57] ABSTRACT

An arm rest (1) for motor vehicle seats comprising a body (2) and a load bearing structure (4) provided with swinging mounting means relative to a connecting element (9) adapted to be fixed to a lateral side (F) of seat backrest (B). The load bearing structure (4) has a tubular end portion (5) coaxially rotatable on a stationary shaft (7) with rotational friction and with respective stop numbers (24, 13) between a raised position and a lowered position of the arm rest (1).

8 Claims, 7 Drawing Sheets

ARM REST FOR MOTOR VEHICLE SEATS

BACKGROUND OF THE INVENTION

The present invention refers to arm rests for motor vehicle seats, particularly front seats having a backrest with lateral sides, of the type comprising an elongated body and a load bearing structure incorporated in the body and including swinging mounting means of the arm rest comprising a connecting element adapted to be fixed relative to a lateral side of the backrest, a tubular end portion of the load bearing structure oriented transverse to the body, and a shaft coaxially inserted within the said tubular end portion and having one end projecting from the body and secured to the said connecting element so as to allow rotation on the said shaft of the tubular end portion of the load bearing structure between a raised position and a lowered position of the arm rest, and stop means for stopping rotation of the arm rest in the said raised and lowered positions.

SUMMARY OF THE INVENTION

The primary object of the present invention is to provide an improved arm rest of the above-mentioned type.

A further object of the invention is providing an arm rest of this type which, in use, is displaceable from the raised position to the lowered position and viceversa only in a controlled way, and which therefore is free from the risk of sudden and undesired displacement from the raised to the lowered position.

Still another object of the invention is to provide an arm rest of reliable and safe operation and adapted to be manufactured in a relatively simple and cheap way.

According to the invention, the above objects are achieved by virtue of an arm rest for motor vehicle seats of the type defined at the beginning, primarily characterized in that the tubular end portion of the load bearing structure has an elastically deformable conformation in a radial direction and is internally formed with a pair of opposed axial ribs and with a pair of longitudinal recesses placed on opposite sides of an adiacent to each of the said ribs, and in that the shaft is exteriorly provided with a pair of opposed rigid axial projections cooperating with the said axial ribs so as to constitute the said stop means; the said axial projections of the shaft having an outer radial dimension which is substantially corresponding to the inner radial dimension of the said longitudinal recesses of the said tubular end portion of the load bearing structure and which is substantially greater than the inner radial dimension of the said tubular end portion between the longitudinal recesses adiacent to each other.

Due to such an idea of solution a steady positioning of the arm rest in the raised and lowered position is achieved and the displacement thereof between such positions, which generates an appreciable frictioned resistance of the rotation of the tubular end portion of the load bearing structure on the shaft, can be only performed in a controlled way, thus preventing free rotation of the arm rest relative to the shaft itself.

According to another aspect of the invention the arm rest is provided with manual regulating means for modifying the angular position of the shaft relative to the connecting element. Such regulating means allow adjusting the slant of the arm rest in the lowered position as a function of the user's need, maintaining the said slant even following displacement of the arm rest to the raised position and successive return to the lowered position.

According to another feature of the invention the arm rest further comprises disengageable locking means for angularly locking the said tubular end portion of the load bearing structure relative to the shaft in the raised position of the arm rest.

BRIEF DESCRIPTION OF THE DRAWINGS

Additional features of the invention will become apparent in the following detailed description, with reference to the accompanying drawings, provided purely by way of non limiting example, wherein.

DETAILED DESCRIPTION OF THE INVENTION

Referring initially to FIGS. 1 through 6, reference numeral 1 generally indicates as a whole an arm rest according to the invention, particularly adapted to be applied on one lateral side F of the backrest B of a motor vehicle front seat.

Figure 1:
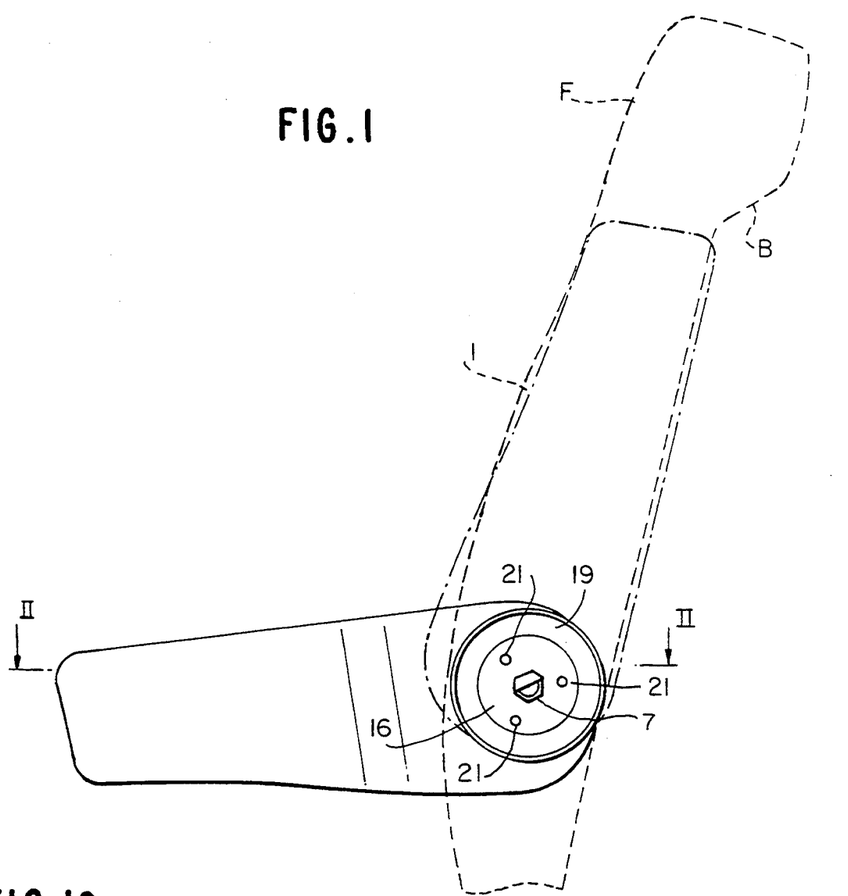
FIG. 1 is a diagrammatic lateral elevation view of an arm rest according to the invention applied to a motor vehicle front seat.
Figure 2:
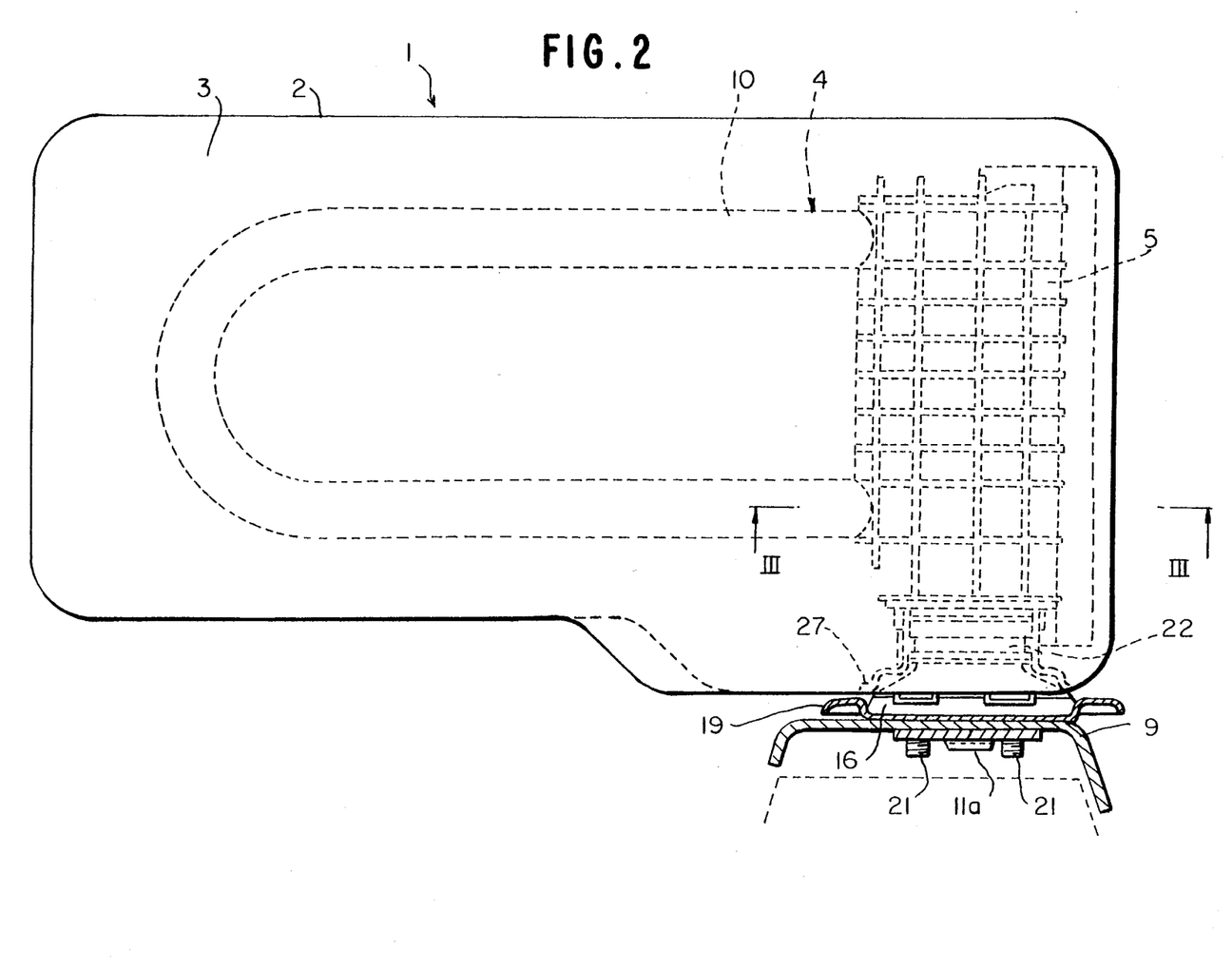
FIG. 2 is a horizontally partially sectioned view in an enlarged scale along line II—II of FIG. 1.
Figure 3:
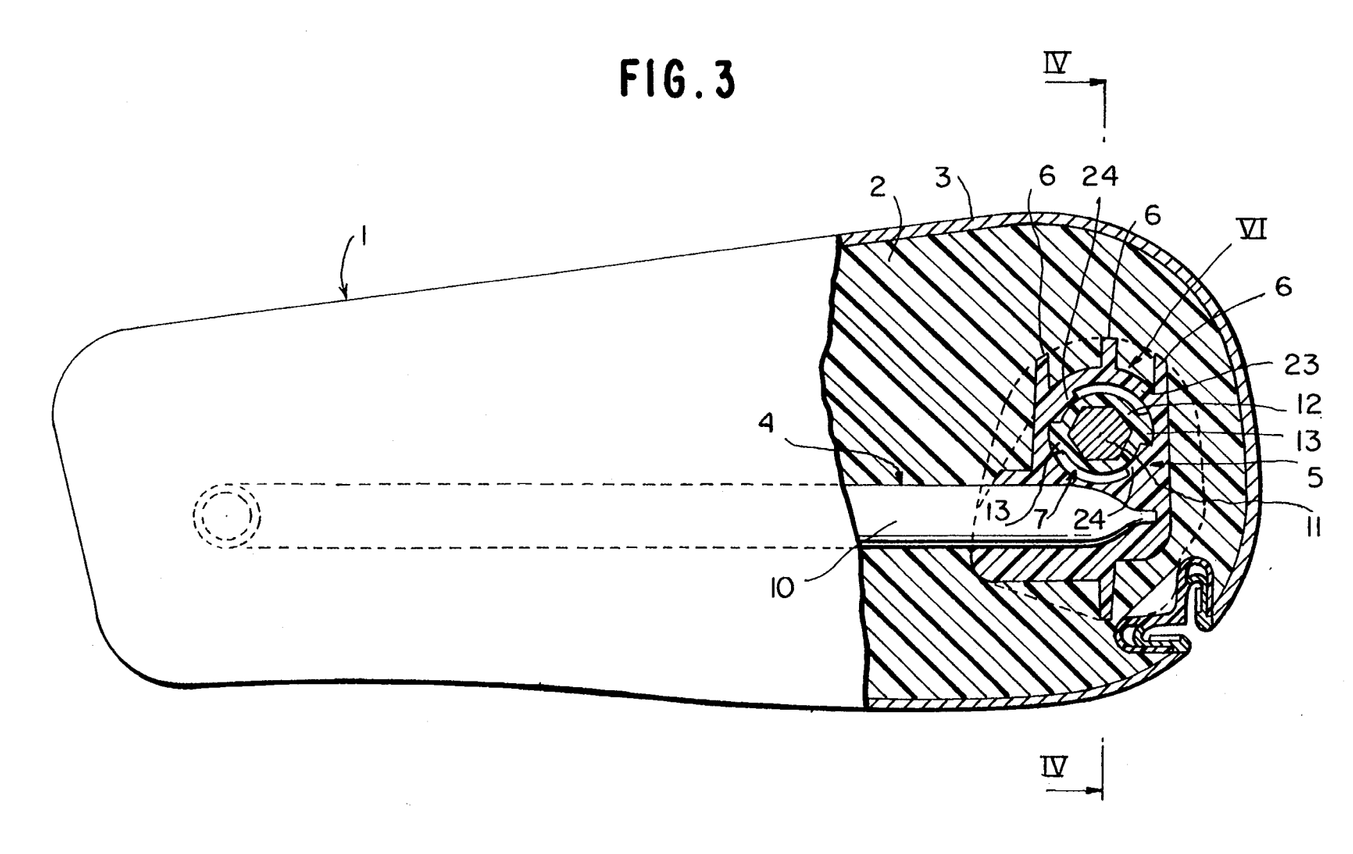
FIG. 3 is a sectioned view along line III—III of FIG. 2.
Figure 4:
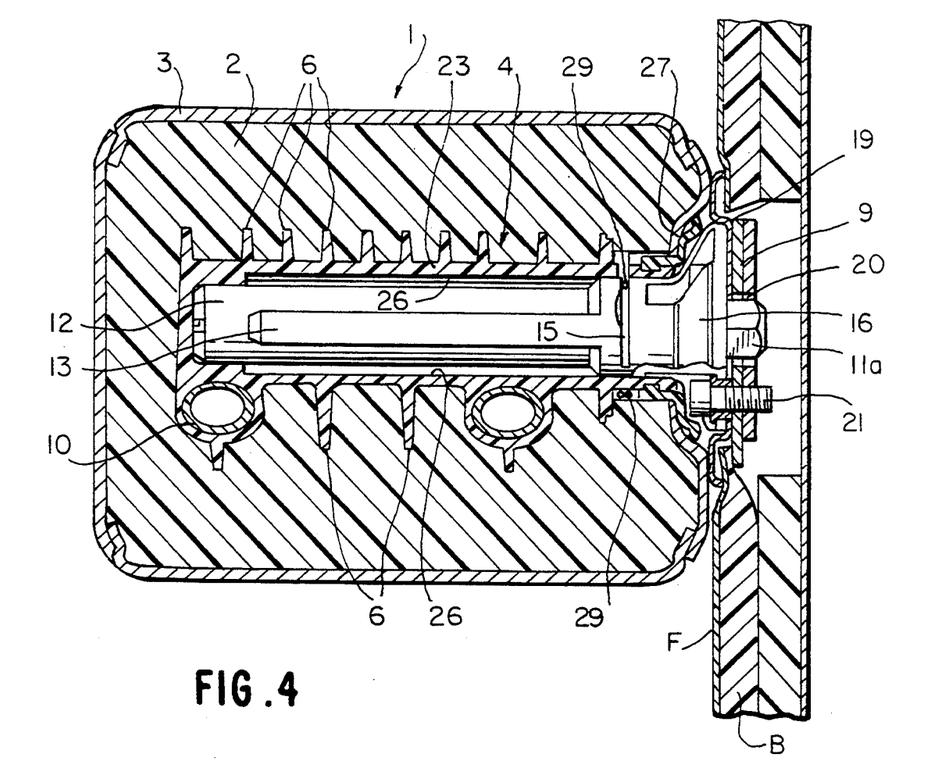
FIG. 4 is a vertically sectioned view along IV—IV of FIG. 3.
Figure 5:
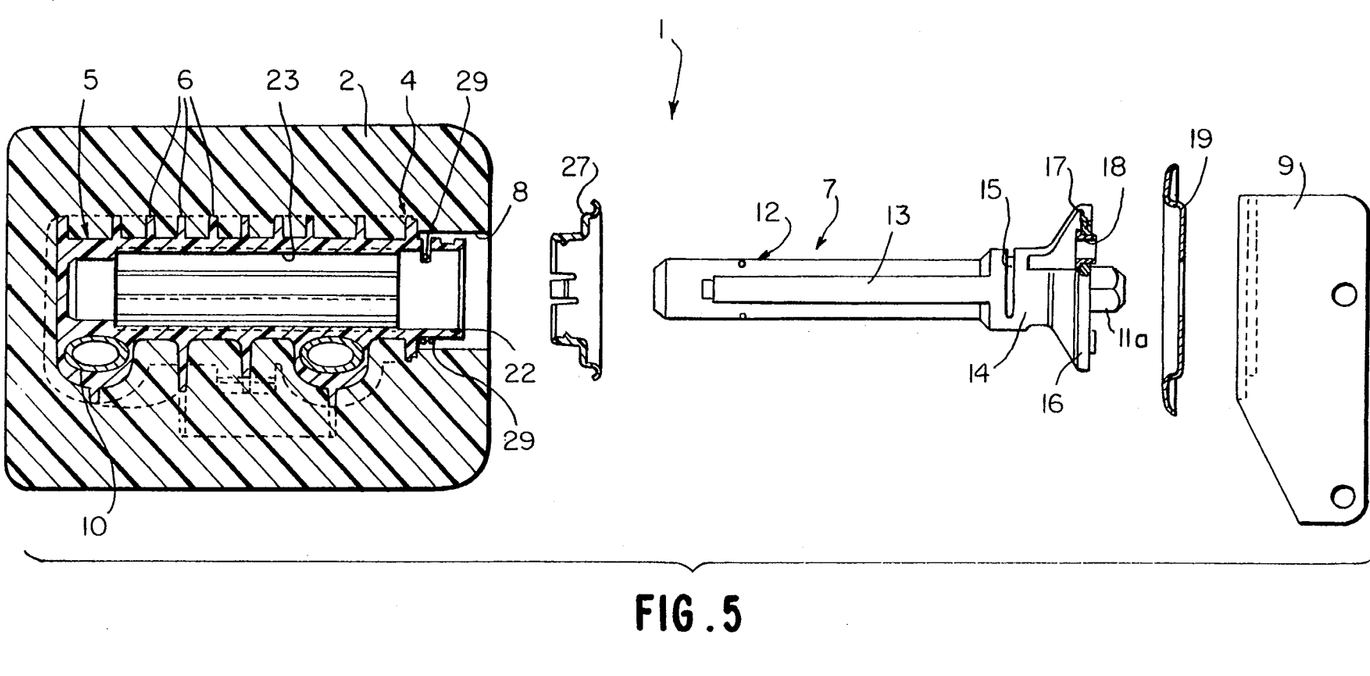
FIG. 5 is a view analogous to FIG. 4 in exploded configuration.
Figure 6:
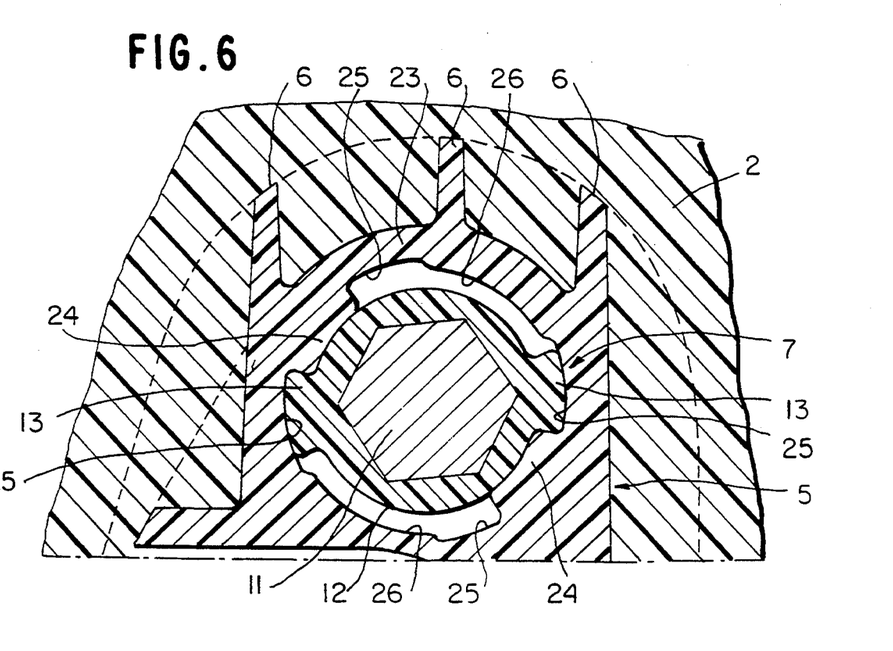
FIG. 6 shows in a larger scale the detail indicated by the arrow VI in FIG. 3.

In the mounted condition the arm rest 1 is swingably cantilever supported by the side F of the backrest B, in the way clarified hereinafter, between an operative lowered position shown with continous line in FIG. 1, in which it extends substantially horizontally aside the backrest B, and an inoperative raised position, shown with dotted lines in the same figure, in which it extends upwardly and substantially parallel to the side F of the backrest B.

In a generally conventional way, the arm rest 1 comprises an elongated body 2 normally made of foamed plastic material with an outer covering 3 and incorporating a load bearing structure 4, formed by a substantially U-shaped metallic element 10 rigidly connected, normally by overmoulding on the free ends of the branches thereof, to a tubular end portion 5 made of plastic material, oriented transverse to the body 2 and provided with exterior stiffening elements 6.

The tubular end portion 5 is rotatably mounted on a support shaft generally indicated as 7, which is coaxially fitted within the tubular end portion 5 and projects from one side thereof, through a corresponding opening 8 of the elongated body 2, for its connection in a stationary condition to the side F of the backrest B, by means of a shaped connecting plate 9.

In details, the shaft 7 is constituted by an inner metal core 11 having a polygonal, normally hexagonal cross section, and by an outer tubular body 12 of plastic material, overmoulded on the metal core 11.

The outer tubular body 12 is formed with a pair of opposed rigid axial projections 13, radially protruding outwardly and terminating, in proximity of the outer end of the shaft 7, into an enlarged portion 14 formed with a peripheral groove 15 and in turn terminating with an enlarged annular collar 16. The collar 16 is at least partially hollow and is provided with a plurality (three in the example shown in the drawings) of axial bores 17 within which respective metal bushes 18 are inserted.

The inner metal core 11 of the shaft 7 axially projects at one end 11a from the enlarged collar 16 in order to engage, with the interposition of a protective annular cover 19, a corresponding polygonal throughhole 20 formed in the connecting element 9.

The connecting element 9 is constituted by a sturdy reinforced metal plate mechanically connected, by means of any conventional system, to the structure of the backrest B, in correspondence of the lateral edge F thereof.

Fixing of the shaft 7 relative to the connecting element 9 is accomplished, following the introduction of the end 11a of the metal core 11 through the hole 20, by fastening screws 21 axially fitted within the bushes 18 of the enlarged collar 16. In the mounted condition, the protection cover 19 is axially held between the collar 16, on one side, and the connecting element 9 on the other side.

Figures 11, 13:
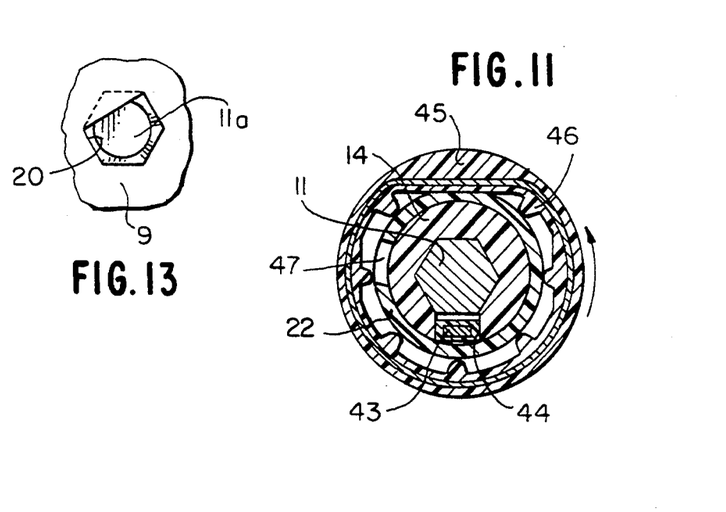
FIG. 11 is a sectioned and reduced view along line IX—IX of FIG. 9.
FIG. 13 is a sectioned view of an alternative embodiment of a component of the arm rest.

To the aim of facilitating mounting, and in particular to render the angular positioning of the shaft 7 relative to the connecting element 9 univocal, the end 11a of the metal core 11 and the throughhole 20 of the connecting element 9 can be conveniently provided with an irregular pentagonal cross section, such as shown in FIG. 13.

The tubular end portion 5 of the load bearing structure 4, which is open in correspondence of one end 22 thereof (facing the opening 8 of the body 2) so as to allow insertion of the shaft 7 therein, has an inner wall 23 which is relatively deformable elastically, by virtue of a relatively reduced thickness thereof and of the intrinsic characteristic of the material constituting the said tubular portion 5. As it is better shown in FIG. 6, the wall 23 is formed interiorly with a pair of opposed axial ribs 24 and with a pair of longitudinal recesses 25 disposed on opposite side of and adjacent to each of the ribs 24. Each of the recesses 25 has a radial dimension substantially corresponding to that of the axial projections 13 of the shaft 7, while the two wall portions 26 comprised between each pair of adjacent recesses 25 have an inner radial dimension slightly lower than the outer radial dimension of the axial projections 13.

The shaft 7 is coaxially inserted within the tubular end portion 5, through the open end 22 thereof and the opening 8 of the body 2, with the interposition of an annular protection cover 27. The axial locking between the tubular end portion 5 and the shaft 7 is simply accomplished by means of an open-ring spring 28 mounted on the open end 22 in correspondence of a slit 29 thereof and engaging the peripheral groove 15 of the outer tubular body 12 of the shaft 7.

In the mounted condition the tubular end portion 5, and thus the whole body 2 of the arm rest 1, are rotatable on the shaft 7 so as to allow angular displacement thereof between the lowered position and the raised position. The oscillation angular travel of the body 2 is limited by the stop of the axial projections 13 of the shaft 7 on one side and on the opposite side relative to the axial ribs 24 of the tubular end portion 5. In both positions the projections 13 engage the corresponding recesses 25, so as to ensure a firm positioning of the arm rest 1. During rotation from one position to the other and viceversa, the radial dimensions of the projections 13 and of the wall portions 26, along with the elasticity of the wall 23, generate a frictional resistance due to which the angular displacement of the body 2 can only be performed in a controlled way, and the engagement of the projections 13 within the recesses 25 when one or the other of the said raised and lowered positions is reached, takes place substantially by a snap fit.

The alternative embodiment shown in FIGS. 7 through 12 is generally similar to the embodiment previously disclosed, and only the differences will be described in details using the same numeral references for designating identical or similar parts.

Figure 7:
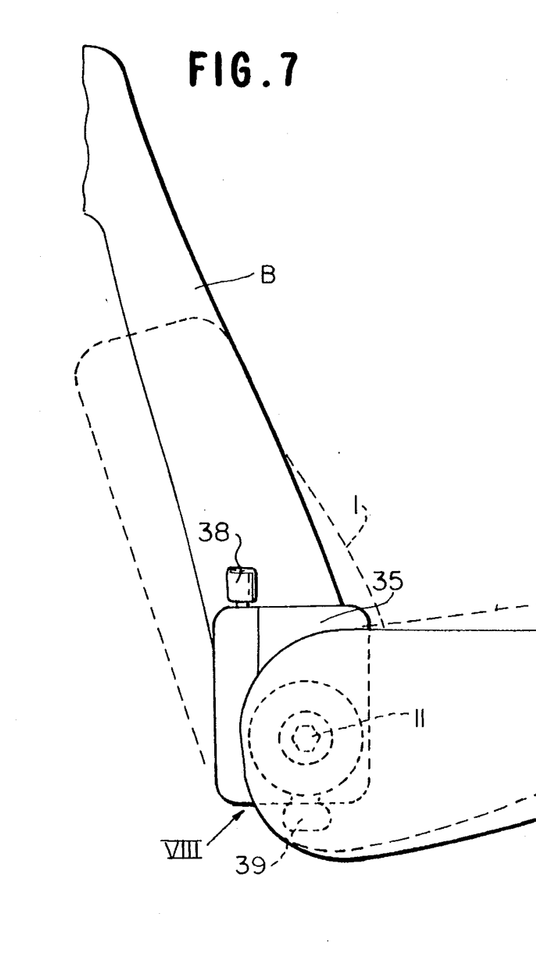
FIG. 7 shows an alternative embodiment of FIG. 1.

According to such an alternative embodiment the arm rest 1 is further provided with a manual regulating device for varying the inclination thereof relative to the backrest B, in the lowered condition, between the positions shown for example in FIG. 7, as well as with a disengageable locking device for locking thereof in the raised position, shown with dotted lines in FIG. 7.

Figure 8:
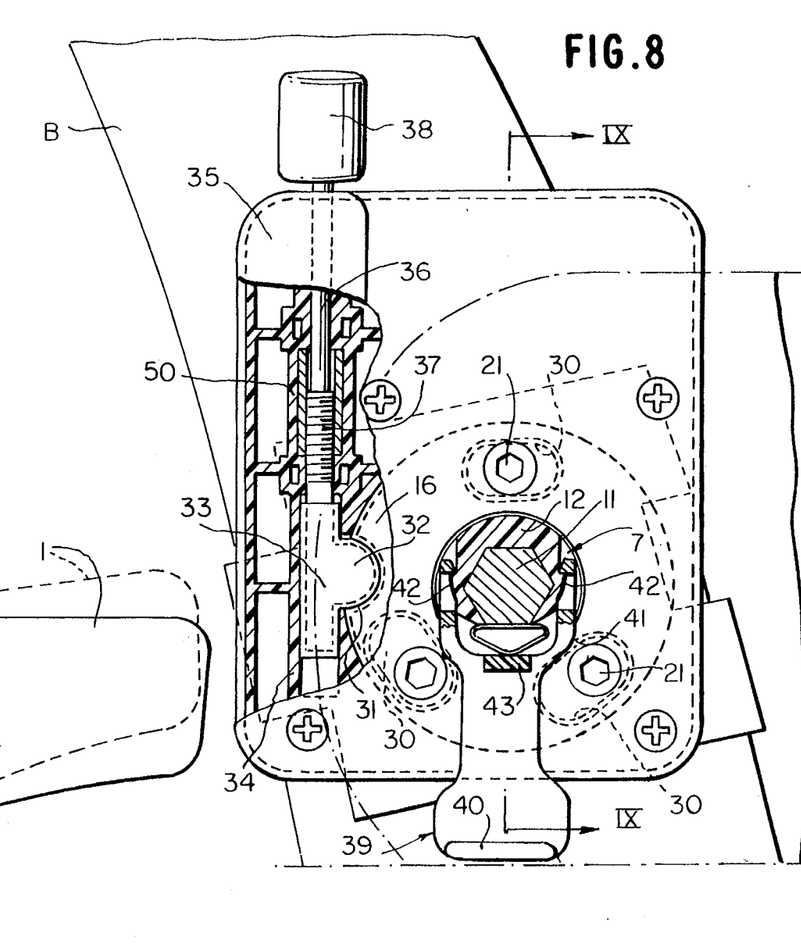
FIG. 8 is a partially sectioned and enlarged view of the detail indicated by the arrow VIII in FIG. 7.

The device for adjusting the inclination is shown in detail in FIG. 8: the openings of the enlarged collar 16 of the outer tubular body 12 of the shaft 7 for insertion of the axial screws 21 are in this case constituted by slots 30, and the said enlarged collar 16 is angularly displaceable relative to the screws 21 for the angular width of the said slots 30. Moreover, the enlarged collar 16 is formed with a peripheral radial notch 31, having a substantially semicircular shape, housing therein a cam member 32 having a complementary shape and carried by a tubular slide 33 slidably mounted substantially vertically along a guide portion 34 formed in a box-like body 35 interposed between the enlarged collar 16 and the connecting element 9. The box 35 rotatably supports an operating shaft 36 coaxial with the slide 33 and formed with a screw 37 engaging an innerly threaded bush 50 and the lower end of which is connected in a freely rotatable way to the slide 33. The shaft 36 projects superiorly from the box 35 with a manually operable driving plug 38, the rotation of which causes the translation of the slide 33 and consequently, by means of the engagement between the cam member 32 and the notch 31 of the enlarged collar 16, angular adjustment of the shaft 7, or in other words adjustment of the slant of the body 2 of the arm rest 1 relative to the backrest B of the seat.

The angular locking of the shaft 7 in the set position is performed by the cam member 32, acting as a latch within the notch 31 of the collar 16.

It must be pointed out that the plug 38 could be substituted by an endless belt drive and associated gear transmission, not shown.

The locking device in the raised position is shown in details in FIGS. 9 through 12. It comprises a push button 39, normally of plastic material, having a grip end 40 projecting below the box-like body 35 and formed superiorly with a fork portion 41 slidably supported vertically in correspondence of a pair of lateral projections 42 protruding from opposite sides of the enlarged portion 14 of the outer tubular body 12 of the shaft 7.

The push button 39 incorporates a L-shaped hook tooth 43, normally metallic, slidably guided along a lower radial slit 44 of the enlarged portion 14.

An annular plastic material body 45, provided with a metal reinforce 46 and shown in detail in FIG. 11, is applied on the open end 22 of the tubular end portion 5 of the load bearing structure 4. Moreover, the open end 22 is formed with a radial notch 47 adapted to be engaged, in the way disclosed hereinafter, by the hook tooth 43.

Figures 9, 12:
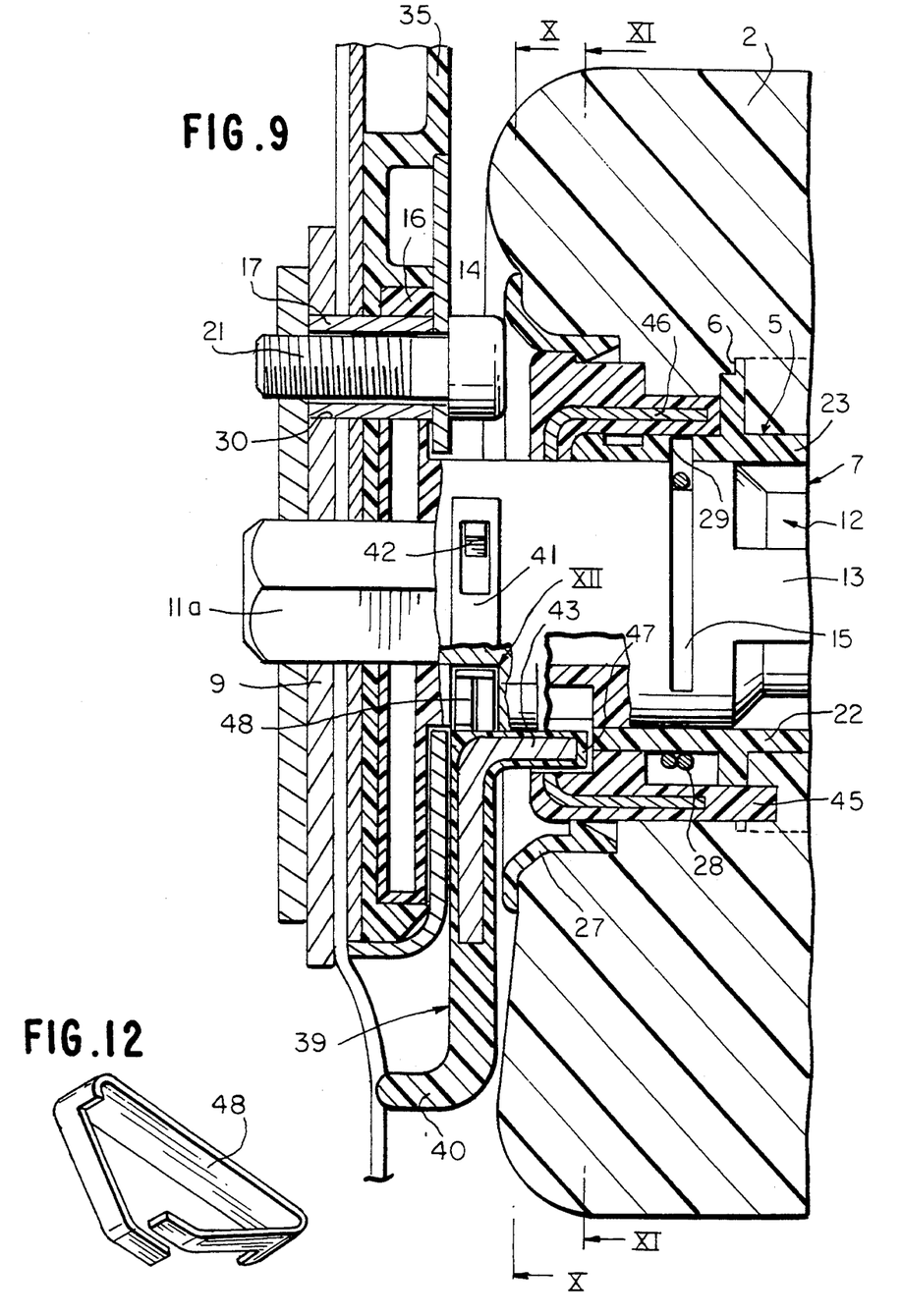
FIG. 9 is a sectioned and enlarged view along line IX—IX of FIG. 8.
FIG. 12 is a perspective view of the detail indicated by the arrow XII in FIG. 9.
Figure 10:
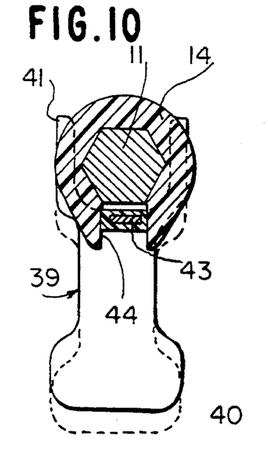
FIG. 10 is a sectioned and reduced view along line X—X of FIG. 9.

The push button 39 is subject to the action of a plate spring 48, having a substantially triangular shape as shown in detail in FIG. 12, reacting against the lower surface of the end 11a of the core 11 of the shaft 7.

Operation of the locking device is as follows.

In the lowered position of the arm rest 1 the opening 47 of the open end 22 of the tubular end portion 5 is angularly positioned such as shown in FIG. 11, i.e. at an angle of about 90° clockwise relative to the hook tooth 43, with reference to such figure. In this position the push button 39 is maintained in a raised condition within the opening 44 of the enlarged portion 14, against the reaction of the spring 48, into abutment against the inner wall of the open end 22.

As soon as the arm rest 1 is rotated to the raised position, the opening 47 is disposed in angular correspondence of the hook tooth 43 and the push button 39 is therefore lowered, under the action of the spring 48, so as to snap engage the hook tooth 43 within such opening 47. In this way the tubular end portion 5, and thus the body 2 of the arm rest 1, are angularly locked in the raised position. This condition is shown in FIG. 9.

As it can also be seen in FIG. 9, in the locked condition the hook tooth 43 bears inferiorly against the inner wall of the annular body 45.

In order to allow unlocking and angular displacement towards the lowered condition of the body 2, it is simply necessary to urge manually upwardly the push button 39, acting on the grip end 40, so as to disengage the hook tooth 43 from the opening 47 and thus release in rotation the tubular end portion 5 relative to the shaft 7.

Naturally the details of constructions and the embodiments can be widely varied with respect to what has been described and illustrated, without departing from the scope of the present invention such as defined in the appended claims.

What is claimed is:

1. An arm rest for motor vehicle seats having a backrest with lateral sides, comprising an elongated body and a load bearing structure incorporated in the body and including swinging mounting means of the arm rest comprising a connecting element adapted to be fixed relative to a lateral side of the backrest, a tubular end portion of the load bearing structure oriented transverse to the body, and a shaft coaxially inserted within said tubular end portion and having one end projecting from the body and secured to said connecting element in order to allow rotation on said shaft of said tubular end portion between a raised position and a lowered position of the arm rest, and stop means for stopping rotation of the arm rest in said raised and lowered positions, wherein said tubular end portion has an elastically deformable conformation in a radial direction and is formed interiorly with a pair of opposed axial ribs and with a pair of longitudinal recesses placed on opposite sides of and adjacent to each of said ribs, and wherein the seat is provided externally with a pair of opposed rigid axial projections cooperating with said axial ribs so as to constitute said stop means; said axial projections of the shaft having an outer radial dimension which is substantially equal to the inner radial dimension of said longitudinal recesses of the tubular end portion of the load bearing structure and which is substantially greater than the inner radial dimension of said tubular end portion between the longitudinal recesses adjacent to each other.

2. An arm rest according to claim 1, wherein the shaft is formed by an inner metal core having a polygonal cross section and by an outer tubular body of plastic material overmoulded on said core and formed with said opposed axial projections, said core having a terminal portion projecting from the outer tubular body adjacent said one end of the shaft and engage within an opening having a complementary shape of said connecting element.

3. An arm rest according to claim 1, further comprising axial lock means of the shaft relative to said tubular end portion of the load bearing structure, including an open-ring spring located adjacent to a slit of said tubular end portion and engaging a corresponding groove formed on said outer tubular body of the shaft in proximity of said one end thereof.

4. An arm rest according to claim 3, wherein said outer tubular body of the shaft is formed adjacent said one end thereof with an annular collar provided with axial bores through which axial fixing screws of the shaft relative to said connecting element are fitted.

5. An arm rest according to claim 4, wherein said axial bores are elongated slots and the arm rest is provided with manual adjustment means for varying the angular position of said shaft relative to said fixing screws.

6. An arm rest according to claim 5, wherein said adjustment means comprise a peripheral notch formed in said annular collar of the outer tubular body of the shaft, a cam member substantially radially engaging said peripheral notch, a box-like body interposed between the body of the arm rest and the connecting element, a tubular slide carrying said cam member and slidably guided in said box-like body, and a driving shaft rotatably supported by said box-like body for controlling displacement of said tubular slide.

7. An arm rest according to claim 1, further comprising disengageable angular locking means carried by said tubular end portion for locking said tubular end portion of the load bearing structure relative to the shaft in said raised position of the arm rest.

8. An arm rest according to claim 7, wherein said disengageable locking means comprise a push button associated with said one end of the shaft and radially displaceable relative thereto between a retracted locking position and an advance unlocking position, said push button incorporating a hook tooth which, in the raised position of the arm rest, is engaged within a radial seat formed in said tubular end portion of the load bearing structure, elastic means being interposed between said one end of the shaft and said push button and acting so as to urge the latter towards said locking retracted position.

* * * * *